Dec. 26, 1961  C. N. SCULLY ETAL  3,014,353
AIR VEHICLE SURFACE COOLING MEANS
Filed Sept. 16, 1959

INVENTORS
CHARLES N. SCULLY
JAMES CASTELFRANCO
BY
Thomas S. MacDonald
ATTORNEY

United States Patent Office 3,014,353
Patented Dec. 26, 1961

3,014,353
AIR VEHICLE SURFACE COOLING MEANS
Charles N. Scully, Whittier, and James Castelfranco, South Gate, Calif., assignors to North American Aviation, Inc.
Filed Sept. 16, 1959, Ser. No. 840,347
5 Claims. (Cl. 62—467)

This invention relates to materials which are subjected to heat and more particularly to means for preventing the skin of hypersonic missiles from becoming too hot.

With the advent of higher speed air vehicles there has been an increasing problem caused by the heat generated by the friction of the air. In high speed air vehicles such as ballistic missiles the heat is sufficient to consume the missile in some cases. At the very least the heat may be sufficient that the temperature of the metal in the airframe is increased to where the metal loses much of its strength and therefore is unreliable for design purposes.

Previous attempts have been made to eliminate the problem caused by the heat of air friction. For example, some missiles provide a large solid nose cone which absorbs the heat and depends upon its high capacity for heat to prevent melting. Prior to this time it has also been suggested that a double wall construction be used with a cooling fluid being forced between the inner wall and outer wall of the structural material. However, such construction has the disadvantage in that a pump and other auxiliary equipment must be provided in order to handle the fluid and force it to the proper place at the proper time and at the proper rate. Such auxiliary equipment not only increases costs but adds undesirable extra weight to the air vehicle. Ablative cooling has also been employed but, since by definition this entails the carrying away or removal of surface layers, the material itself may not be used for continuing structural integrity.

With the foregoing problems in mind it is generally an object of this invention to provide a new means for preventing portions of a body which is subjected to heat from becoming too hot.

It is a further object of this invention to provide a new structure which is useful in the construction of leading edge portions of high speed air vehicles.

A still further object of this invention is to provide an improved sandwich structure which will automatically supply an insulating layer of gas to cool the sandwich structure when subjected to heat.

Other and further objects of this invention will become apparent in the detailed description below taken in conjunction with the attached drawings wherein.

Figure 1:
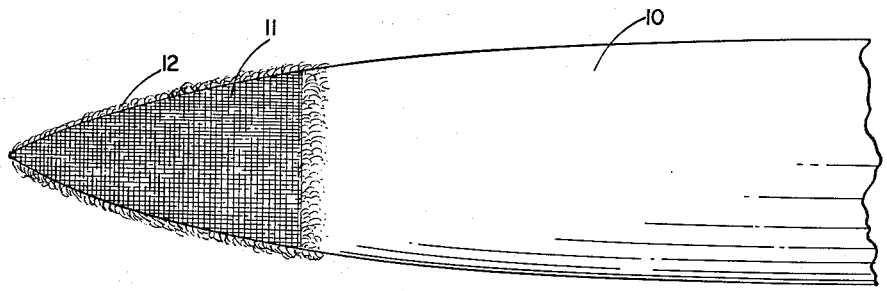
FIG. 1 shows a missile incorporating the present invention in the nose thereof.

FIGURE 1 discloses an illustrative example of the manner in which the present invention is used. In FIGURE 1 it is seen that a missile 10 has a nose cone including a porous outer wall 11 which is a basic part of the present invention. It can be seen that a boundary layer of cooling gases 12 is expelled from the porous outer wall 11 during flight to protect the missile nose cone from the heat of air friction.

Figure 2:
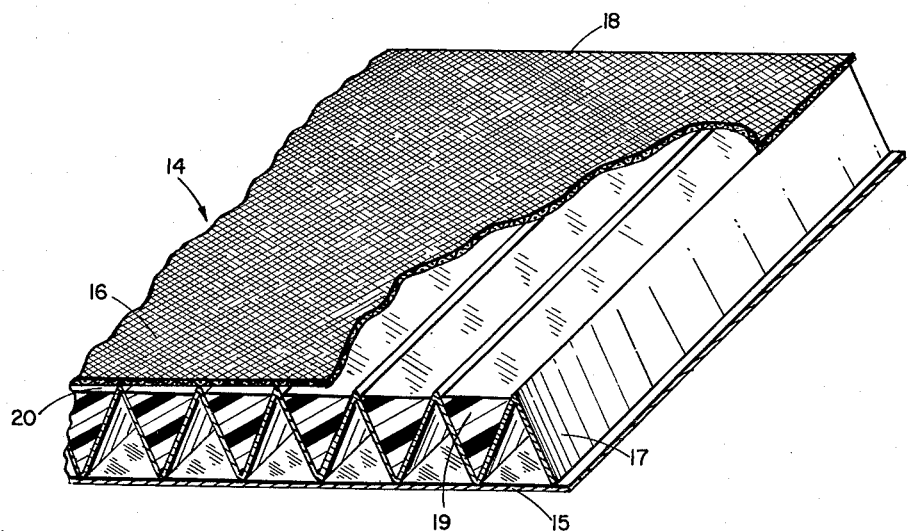
FIG. 2 is a partially cutaway drawing showing a first form of the invention.

FIGURE 2 shows a corrugated core sandwich structure 14 which is the preferred embodiment of the present invention. The sandwich structure 14 includes an impervious steel facing sheet 15 and a porous second facing sheet 16. In this embodiment of the invention the second facing sheet is formed of a double layer of 400 mesh (apertures per inch) stainless steel wire screen. Wire screen having a mesh size in the range of 200 to 800 is preferred; however, as will be pointed out in more detail below the particular mesh used and the number of layers of screen, e.g., one or more, depends to a large extent upon the particular coolant material used with the disclosed structural sandwich.

The facing sheets 15 and 16 are held in fixed spaced relation by a metal corrugated core 17 which is similar to the core material disclosed in Patent No. 2,747,064 assigned to the assignee of the present invention. The core 17 is welded to the facing sheets 15 and 16 by a series of welds along the ridges of the convolutions as at 18. A typical welding technique is shown in the above mentioned patent. The mesh of the wire is fine enough that satisfactory spot welds may be made between the top of the convoluted core, which may be generally slightly flattened both at its nadir and zenith, and the wire itself. In so far as spot welding is concerned, it is necessary that the mesh be small enough so as in effect it acts as a flat, non-porous sheet. In order to increase the strength-to-weight ratio of the present structure the core 17 is made of a stainless steel which is somewhat thinner in cross-section than both the facing sheet 15 and the total thickness of the two layers of wires of the screen forming facing sheet 16. The convolutions of the core material 17 may extend in a generally longitudinal direction relative to the missile whereby each convolution would lie in a plane extending generally parallel to the axis of the missile for maximum rigidity or they may extend at some angle to the axis of the missile.

Located within the interstices or channels formed by the convolutions of core material 17 which face the outer or porous facing sheet 16 is vaporizable or sublimable material 19 which fills the space within such channels. Several materials are suitable in that they will sublimate or sublime within a desired temperature range. For example, the material 19 may be composed of ammonium carbamate which decomposes at standard atmospheric pressure at about 60° centigrade into ammonia gas and carbon dioxide gas. With such material a double layer of 400 mesh wire may be used successfully. Zinc oxide also is suitable at the reduced pressures present at the very high altitudes where the majority of the heat is generated in ballistic missile nose cones. At such reduced pressures the zinc oxide will decompose into zinc vapor and gaseous oxygen at approximately 1800° centigrade. Another example of material which will work adequately in the present invention is copper sulfate. This material decomposes in stages approximately according to the Table I below.

TABLE I

Temperature:
    110° C_____. $CuSO_4 \cdot 5H_2O \rightarrow CuSO_4 \cdot H_2O + 4H_2O(g.)$
    150° C_____. $CuSO_4 \cdot H_2O \rightarrow CuSO_4 + H_2O(g.)$
    650° C_____. $CuSO_4 \rightarrow CuO + SO_3(g.)$
    1000° C____. $CuO \rightarrow \frac{1}{2}Cu_2O + \frac{1}{2}O_2(g.)$
    1800° C____. $Cu_2O \rightarrow Cu(g.) + \frac{1}{2}O_2(g.)$ When $CuSO_4 \cdot 5H_2O$ or zinc oxide is used it is preferred that larger mesh, e.g., 300 to 500, be used because minute particles of copper and sulfur or zinc tend to clog the pores of the screen during the intermediate stages of decomposition of the material. Water gel also may be used to fill the space in the core material. For example, 5% methoxy cellulose and 95% water forms a solid gel which will dehydrate at 100° centigrade under standard atmospheric conditions to water vapor which will perform the cooling operation. Other examples of materials which will sublimate and will work successfully are beryllium chloride which sublimates at about 958° F. at standard atmospheric conditions and cadmium oxide which sublimates at approximately 1660° F. at standard atmospheric conditions.

The material 19 located within the core 17 can also be a material which undergoes an endothermic chemical change such as ammonium carbamate or ammonium hydrosulfide which absorbs heat during that change or a material such as beryllium bromide or indium chloride which melts and then vaporizes. In certain applications liquids such as water or ammonia may be employed within the described corrugations while providing a fine wire mesh of from about 500 to 800 mesh size which would prevent, due to surface tension, leakage in the liquid state but allow leakge in the gaseous state to effect surface cooling.

In operation, as air friction generates heat in the outer facing sheet 16 that heat is passed through to the vaporizable material. At this time the material 19 changes directly from a solid into a gas, in the case of sublimation, filling the interstices 20 in the porous outer facing sheet 16 and above the material 19, and passes out through the porous outer sheet 16. Cooling of this composite skin arises from several phenomena: (1) the solid coolant 19 absorbs heat needed for the vaporization of the solid, (2) the gas vapors are being continuously formed and are continuously flowing out through the porous outer skin after filling the interstices forming a layer of insulating gas within and outside the outer porous skin, and (3) the boundary layer around the nose cone is constantly being replaced by cooler vapor which flows through the porous skin and is subsequently swept away as hot gas.

The particular structural material 14 shown in FIG. 2 should be used in the missile in such a manner that the outer facing sheet 15 is loaded mainly in tension since the structure is peculiarly adapted for that application. For this reason, it is also preferred that the structural material be used with the outer side of facing sheet 16 formed in a convex shape which makes it peculiarly adapted for normal airframe use.

Figure 3:
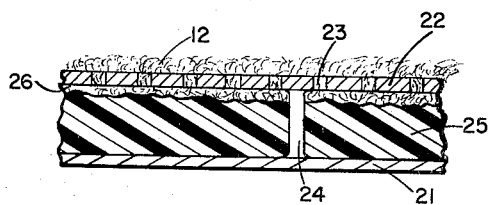
FIG. 3 is a cross-sectional view of another form of sandwich structure which illustrates the present invention.

FIGURE 3 shows a second embodiment of sandwich structure which will accomplish the present invention. Here a first facing sheet 21 and a second facing sheet 22 having a multitude of small drilled holes 23 therein are held in spaced relation by a series of core spacer members 24. A sublimatory material 25 is located in the space between the inner facing sheet 21 and the outer facing sheet 22 and fills a large portion of the space leaving only a small inner interstice 26 in much the same manner as the corrugated core structural sandwich shown in FIGURE 2. The sublimatory material 25 may be any material which sublimates or vaporizes at a proper temperature such as those materials mentioned in the examples above. FIGURE 3 discloses how the gas 12 forms a layer in the interstices 26 and passes through the hole 23 to the boundary layer area of the outside face of outer facing sheet 22.

Although only two preferred embodiments of the present invention have been illustrated and described herein, it is to be understood that such is by way of illustration only and the invention is not limited thereto for the same is susceptible to changes in detail and form without departing from the scope of the invention which should be limited only to the scope of the appended claims.

We claim:

1. A sandwich structure comprising: means forming a first and a second facing sheet; a structural core between said first and second sheets and forming interstices therewith, said core engaging and holding said sheets in spaced relation; one of said facing sheets being a wire screen whereby gas may pass from said interstices through said wire screen effecting cooling of such sheet, a sublimatory means situated in a selected number of said interstices so as to automatically provide for cooling of said porous facing sheet.

2. A sandwich structure comprising: a first and a second facing sheet; a core material located between and spacing said facing sheets a fixed distance apart, said core material being formed with longitudinally extending convolutions forming a series of channels with the ridges of the convolutions being attached successively to one and then the other of said facing sheets; one of said facing sheets consisting of a fine mesh wire screen which allows for passage of a gas therethrough, a sublimatory material situated in the channels formed adjacent one of said facing sheets.

3. A sandwich structure comprising: a first and a second facing sheet; a core material located between and spacing said facing sheets a fixed distance apart, said core material being formed with longitudinally extending ridged convolutions forming a series of channels with the ridges of the convolutions being attaced to said facing sheets; a sublimatory material situated in at least part of the channels in communication with one of said facing sheets; said one facing sheet having a plurality of small apertures therethrough adapted to allow gases from the sublimatory material to pass therethrough, said second facing sheet being solid.

4. A sandwich structure comprising: a first and a second facing sheet; at least one of said sheets being formed of at least one layer of fine mesh woven wire screen; a core attached to said first and second sheets and forming voids therewith, said core engaging and holding said sheets in fixed spaced relation; a material which becomes gaseous when heated located in said voids abutting said core and communicating with at least one facing sheet whereby gas generated from said material may flow through said fine wire screen to effect cooling thereof.

5. A sandwich structure as claimed in claim 4 wherein the mesh of the wire screen in apertures per inch is within a range of from 200 to 800.

References Cited in the file of this patent

UNITED STATES PATENTS

| | | |
|---|---|---|
| 2,468,820 | Goddard | May 3, 1949 |
| 2,843,341 | Dannenberg | July 15, 1958 |
| 2,908,455 | Hoadley | Oct. 13, 1959 |
| 2,922,291 | Fox | Jan. 26, 1960 |
| 2,941,759 | Rice | June 21, 1960 |